June 11, 1968   F. R. ABBOTT   3,388,374
SONIC BEAM FORMER
Filed Jan. 25, 1967
FIG. 1
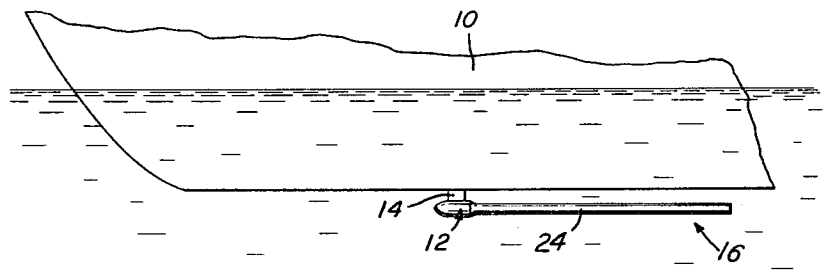
FIG. 2
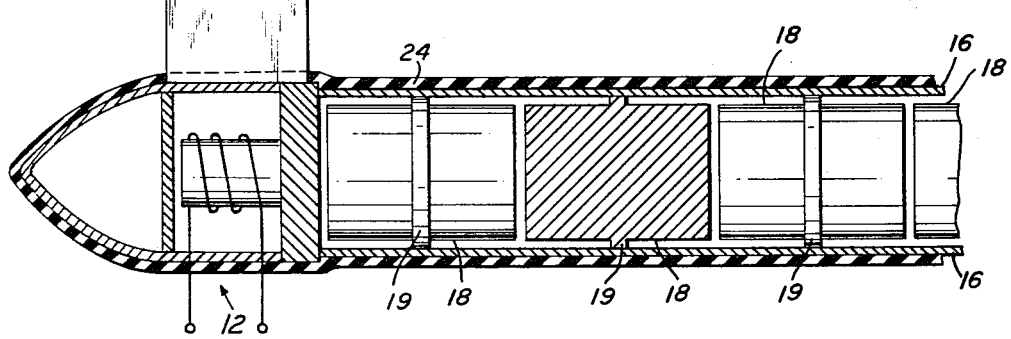
FIG. 3
FIG. 4
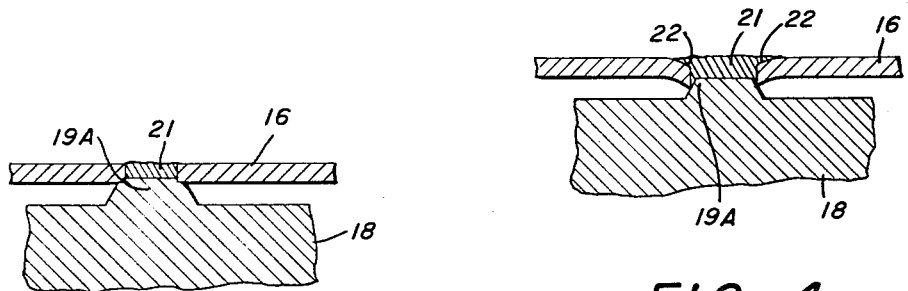
INVENTOR.
FRANK R. ABBOTT
BY
ATTORNEYS 3,388,374
SONIC BEAM FORMER
Frank R. Abbott, San Diego, Calif., assignor to the United States of America as represented by the Secretary of the Navy
Filed Jan. 25, 1967, Ser. No. 612,294
2 Claims. (Cl. 340—12)

ABSTRACT OF THE DISCLOSURE

The exterior of an end-fired beam-forming pipe is streamlined and smooth. The interior of the tube carries weights for adjusting the velocity of propagation of compressional waves in the wall of the tube to the optimum value for effective beam forming.

---

The invention described herein may be manufactured and used by or for the Government of the United States of America for governmental purposes without the payment of any royalties thereon or therefor.

BACKGROUND

In spite of the heretofore highly developed state of the transducer art, there has been no transmitting or receiving device suitable for suspension directly from the ship's hull. Water flowing over a transducer at twenty or thirty knots, say, is turbulent and will produce excessive local noise unless a streamlined shroud or dome is used. Heretofore ships were provided only with transducers under a dome fitted to and streamlined with the ship's hull.

The object of this invention is to provide a rod-like beam-forming transducer which is exteriorly smooth and adapted for laminar water flow.

SUMMARY

A vibration generator is attached to one end of a pipe to compress the metal of the pipe and start compressional waves along the pipe. To reduce the velocity of propagation of the compressional wave in metal, which is usually quite high, to the velocity of sound in water, weights are attached at spaced points along the interior wall of the pipe, and at the same time the wall thickness is reduced. As will be shown these two values can be selected to precisely obtain optimum wave velocity for beam forming.

Other objects and features of this invention will become apparent to those skilled in the art by referring to the preferred embodiments described in the following specification and shown in the accompanying drawings in which:

FIG. 1 shows one transducer of this invention mounted on the hull of a boat;

FIG. 2 is a longitudinal sectional view of the transducer transmitting tube of FIG. 1; and FIGS. 3 and 4 show in section details of construction of the tube of FIG. 1.

In FIG. 1 at 10 is represented an underwater portion of the hull of a ship. Attached to the hull is a transducer comprising a vibrating element 12 attached to the hull with a streamlined steel bracket 14. Extending to the right from the vibrator and parallel to the direction of water flow is a long self-supporting tube 16. In operation, compressional waves are initiated in the vibrator end of tube 16 and is propagated toward the opposite end. The velocity of propagation, according to this invention, is substantially equal to the velocity of sound waves in water. It is well known that with such operation a beam is formed in axial alignment with the tube 16. The front-to-back power gain ratio can be of the order of 20 to 30 decibels.

In order to achieve proper beam-forming action four requirements are to be met, namely; (1) the sound of velocity of the rod must be very nearly the same as in water, (2) an acoustical impedance mismatch must exist between the rod material and the water so that not all of the energy is radiated from the first part of the rod but is propagated a sufficient distance along the rod to provide an effective array aperture, (3) the amplitude of the reflected wave from the far end must be no greater than about one-tenth the amplitude of the initial wave to preserve a reasonable front-to-back ratio, (4) the driver unit should transmit most of its energy longitudinally into the rod, and (5) the rod material should be light yet strong in order to eliminate the requirement for major supporting structures. While no material exists that can satisfy all of these requirements, steel and other metals including aluminum and magnesium have all of the requirements except the velocity of sound requirement.

The longitudinal sound velocity, V, in a metal rod is equal to the square root of the longitudinal modulus of elasticity, E, divided by the density, $p$, of the material. That is, $$V = \sqrt{\frac{E}{P}}$$

If, now, density is expressed in terms of mass, M, per unit length L, per unit cross-sectional area, A, of the rod, then $$V = \sqrt{\frac{E \cdot A}{M/L}}$$

According to an important feature of this invention the area A is reduced and/or the mass M is increased to yield the requisite reduction in velocity V. To obtain an optimum value of V, a thin walled tube is employed instead of a rod. As shown in FIG. 2 the tube wall is quite thin so that the total cross-sectional area of the metal of the tube, for a given diameter of tube, is quite small. However, the overall mass of the tube is increased by the attachment of weights at uniformly placed points along the tube. As shown in FIG. 2 the weights are cylindrical in shape, are slightly less in diameter than the interior of the tube and are affixed as by brazing to the interior of the tube. The weights are spaced apart end-to-end so that energy cannot flow directly from one weight to the next. This means that the compressional wave must travel from left to right only in the wall of the tube. In one embodiment the cross-section of the tube is adjusted so that the wall is about one-tenth the cross-section of an equivalent solid rod. The ten-to-one reduction in cross-section with little change in mass per unit area reduces the sound velocity by the square root of ten. That is, the reduced velocity is approximately equal to the velocity of sound in sea water. A tube of magnesium with magnesium weights has been employed with success. The light weight makes the long rod less unwieldly. Another advantage of magnesium is the low mechanical hysteresis which makes high efficiency realizable. The intrinsic sound velocity in magnesium is objectionably high being near that of steel. But, the low density of magnesium reduces the propagation constant somewhat so that the sound wave energy is transferred to the surrounding water at the proper rate.

The weights 18 are each machined with a flange 19 near the center of the weight which is of a closely controlled diameter to snugly fit in the tube. The ends of the weights must be spaced apart to prevent the flow of compressional wave energy directly from one weight to the next. Solid attachment between the weight and the tube may be effected by sweating or brazing the flange 19 to the polished inner surface of the tube wall.

FIGS. 3 and 4 show alternative methods of fabricating the transducer tube 16. A large number of short sections of the tubing are provided, the lengths of the sections being about the same as the length of the cylindrical weights 18. The flange 19a may be turned to a diameter slightly larger than the inside diameter of the tube to receive opposed ends of the two sections, as shown in FIG. 3, whereupon welding metal is flowed into the annular crevice between the ends of the sections. A solid welded bond must be made at the end of each section to prevent the leakage of water to the interior of the tube as well as to assure good mechanical bond between the end-to-end sections.

If greater space is desired for the welded metal, the ends of the sections may be rolled inwardly slightly as shown at 22 in FIG. 4. Here the crevice to be filled is slightly deeper than in FIG. 3.

It is desirable to encase the entire tube and vibrator in a smooth plastic jacket as shown at 24 to obviate all irregularities in the surface of the structure in which turbulation of fast flowing water may occur.

Thus, it is apparent that the value of cross-sectional area A in the expression above, is decreased and the magnitude of M is increased to decrease the sound velocity V in the tube. Front-to-back ratios of the beam of the order 20 to 30 db have been obtained.

Obviously many modifications and variations of the present invention are possible in the light of the above teachings. It is therefore to be understood that within the scope of the appended claims the invention may be practiced otherwise than as specifically described.

I claim:
1. In a transducer:
   an elongated tube with a continuous substantially smooth cylindrical outer surface, said tube being of a metal having a predetermined longitudinal modulus of elasticity, and density,
   a series of end-to-end cylindrically shaped weights disposed inside said tube, the outside diameter of said cylindrical weights being less than the inside diameter of said tube; an outwardly extending flange encircling each weight attached to the inner wall of said tube to center each weight in said tube, and the ends of said cylindrically shaped weights being spaced and mechanically decoupled,
   a vibration generator affixed to one end of said tube to initiate compressional waves in said tube and to propagate said waves lengthwise of said tube,
   the cross-sectional area of the wall of said tube and the combined mass of said weights and tube being so selected that the velocity of propagation of said waves along said tube is commensurate with the velocity of sound in water.
2. In the transducer defined in claim 1:
   said elongated tube comprising a plurality of end-to-end sections of tubing, each end of each section being welded, throughout the circumference of the section, to one of said outwardly extending flanges.

References Cited
UNITED STATES PATENTS

| | | | |
|---|---|---|---|
| 1,355,598 | 10/1920 | Fessenden. | |
| 1,470,733 | 10/1923 | Hayes. | |
| 1,678,116 | 7/1928 | Harrison | 340—8 |
| 2,408,435 | 10/1946 | Mason. | |
| 2,958,488 | 11/1960 | Wilcoxon | 340—8 |
| 3,142,034 | 7/1964 | Junger | 181—.5 X |

RODNEY D. BENNETT, *Primary Examiner.*

B. L. RIBANDO, *Assistant Examiner.*